(12) United States Patent
Sasaki et al.

(10) Patent No.: US 8,970,933 B2
(45) Date of Patent: Mar. 3, 2015

(54) HEAD-UP DISPLAY DEVICE FOR VEHICLE

(71) Applicant: Denso Corporation, Kariya, Aichi-pref. (JP)

(72) Inventors: Tatsuya Sasaki, Chiryu (JP); Hideyuki Nakane, Nishio (JP)

(73) Assignee: Denso Corporation, Kariya (JP)

( * ) Notice: Subject to any disclaimer, the term of this patent is extended or adjusted under 35 U.S.C. 154(b) by 160 days.

(21) Appl. No.: 13/756,949

(22) Filed: Feb. 1, 2013

(65) Prior Publication Data

US 2013/0201541 A1     Aug. 8, 2013

(30) Foreign Application Priority Data

Feb. 3, 2012  (JP) ................. 2012-022169

(51) Int. Cl.
*G02B 26/00* (2006.01)
*G03H 1/00* (2006.01)
*G02B 27/14* (2006.01)
*G03B 21/26* (2006.01)
(Continued)

(52) U.S. Cl.
CPC .... *G02B 27/0149* (2013.01); *G02B 2027/0154* (2013.01); *H02K 37/14* (2013.01); *B60L 1/003* (2013.01); *B60L 2250/16* (2013.01); *Y02T 10/641* (2013.01); *H02P 8/22* (2013.01); *H02P 8/24* (2013.01)
USPC ............ 359/221.3; 359/13; 359/630; 353/28; 349/11; 348/115; 340/815.74

(58) Field of Classification Search
USPC ......... 359/221.3, 630–634, 13–14; 310/49 R, 310/156.32, 156.33, 156.34, 266–268, 310/156.35, 156.36, 156.02; 353/11–12, 353/28, 119; 349/11; 348/115; 340/438, 340/980, 995.1, 815.47, 815.74
See application file for complete search history.

(56) References Cited

U.S. PATENT DOCUMENTS

| | | | |
|---|---|---|---|
| 2011/0134498 A1 | 6/2011 | Ohta et al. | |
| 2011/0193508 A1 | 8/2011 | Oomori | |
| 2011/0241596 A1* | 10/2011 | Sasaki et al. | 318/685 |

FOREIGN PATENT DOCUMENTS

| | | |
|---|---|---|
| JP | 03-251071 | 11/1991 |
| JP | 2005-151783 | 6/2005 |

(Continued)

OTHER PUBLICATIONS

Office action dated Mar. 3, 2014 in corresponding Korean Application No. 10-2013-11901.

(Continued)

*Primary Examiner* — Dawayne A Pinkney
(74) *Attorney, Agent, or Firm* — Harness, Dickey & Pierce, PLC (57) ABSTRACT

A HUD device includes a stepper motor, which rotates a reflection mirror for adjusting a display position of a virtual image. The stepper motor has an electric stabilization point and a mechanical stabilization point. A control system controls a drive signal for the stepper motor to change by a step angle at every predetermined period Ts in response to an adjustment instruction inputted from an adjustment switch. The control system continues to apply the drive signal until the electric stabilization point is attained even after the adjustment instruction is stopped to operate the stepper motor in a powered rotation mode. The stepper motor then operates in an inertia rotation mode toward the mechanical stabilization point is attained.

6 Claims, 7 Drawing Sheets

(51) Int. Cl.

| | | |
|---|---|---|
| *G02F 1/1335* | (2006.01) | |
| *H04N 7/00* | (2011.01) | |
| *G08B 5/36* | (2006.01) | |
| *G02B 27/01* | (2006.01) | |
| *H02K 37/14* | (2006.01) | |
| *B60L 1/00* | (2006.01) | |
| *H02P 8/22* | (2006.01) | |
| *H02P 8/24* | (2006.01) | |

(56) References Cited

FOREIGN PATENT DOCUMENTS

| JP | 2007-181334 | 7/2007 |
|---|---|---|
| JP | 2010-051070 | 3/2010 |
| JP | 2010-136478 | 6/2010 |
| JP | 2011-207431 | 10/2011 |
| JP | 2012-023806 | 2/2012 |

OTHER PUBLICATIONS

Office action dated Mar. 3, 2014 in corresponding Korean Application No. 10-2013-11904.
Sasaki, et al, U.S. Appl. No. 13/756,899, filed Feb. 1, 2013, "Head-Up Display Device for Vehicle".
Office Action dated Sep. 29, 2014 in the corresponding CN Application No. 201310041308.6 with English translation.
Office Action issued Oct. 10, 2014 in the corresponding CN Application No. 201310042817.0 (with English translation).
Office Action dated Sep. 4, 2014 in the related U.S. Appl. No. 13/756,899.

* cited by examiner

HEAD-UP DISPLAY DEVICE FOR VEHICLE

CROSS REFERENCE TO RELATED APPLICATION

This application is based on and incorporates herein by reference Japanese patent application No. 2012-22169 filed on Feb. 3, 2012.

TECHNICAL FIELD

The present disclosure relates to a head-up display device for a vehicle.

BACKGROUND

In a conventional head-up display (HUD) device for a vehicle, a light-emitted image such as vehicle information, which is displayed by a display unit, is projected onto a projection target such as a windshield of a vehicle so that the displayed image may be displayed as a virtual image. JP 2011-207431A (US 2011/0241596 A1) discloses one example of such a HUD device, in which a display image provided by a display unit is reflected by a reflection mirror such as a concave mirror and projected onto a projection target. By using the reflection mirror, the HUD device can be mounted in a limited space in a vehicle.

In this HUD device, a stepper motor is used to rotate the reflection mirror in response to a drive signal corresponding to an adjustment instruction from an external side so that a display position of virtual image may be adjusted. According to this configuration, a passenger (driver) in a vehicle is enabled to adjust a position of a virtual image of vehicle information to a position, which is more readily viewable, by inputting a position adjustment instruction to the HUD device.

In addition, in the HUD device, the stepper motor is continued to be driven by the drive signal until it is stabilized electrically, when the input of the adjustment instruction is stopped. If the drive signal is stopped at a point, which is not at the electrically stabilization point, the stepper motor tends to step out of phase in response to an impact of external force or vibration. The drive signal is continued to be applied for a while to avoid this out-of-phase problem.

In the HUD device, it is assumed that plural electric stabilization points, at which the stepper motor is electrically stabilized by holding torque generated when powered, and plural mechanical stabilization points, at which the stepper motor is mechanically stabilized by detent torque provided when not powered, match each other. Under this assumption, the stepper motor is stabilized by continuously applying the drive signal until the electric stabilization point is attained, even when the drive signal is stopped after the electric stabilization point. In this case, the stepper motor is assumed to be stabilized by the detent torque generated at the electric stabilization point.

In actual products, however, the electric stabilization points and the mechanical stabilization points are different in phase due to manufacturing tolerance and the like. As a result, in a case that the drive signal is continued to be applied at the electric stabilization point and thereafter stopped, the stepper motor temporarily stops and then starts rotation toward the mechanical stabilization point. This causes the display position of the virtual image to move again after being stopped once. Passengers in the vehicle will thus feel discomfort and even unreliability of the vehicle information displayed as the virtual image.

SUMMARY

It is an object therefore to provide a head-up display device for a vehicle, which increases reliability of a virtual image display of vehicle information.

According to one aspect, a head-up display device for a vehicle includes a display unit, an optical system, a stepper motor and a control system. The display unit displays a light-emitted image of vehicle information. The optical system includes a reflection mirror, which is provided rotatably to reflect the light-emitted image and project a reflected image toward a projection target so that a virtual image of the light-emitted image is displayed. The stepper motor drives, when powered by a drive signal, the reflection mirror to rotate for adjusting a display position of the virtual image. The stepper motor has plural electric stabilization points, at which a motor operation is electrically stabilized by a holding torque generated when powered, and plural mechanical stabilization points, at which the motor operation is stabilized by a detent torque generated when not powered. The control system controls the drive signal for the stepper motor in response to an adjustment instruction inputted from an external side. The control system is configured to continue to apply the drive signal even after the adjustment instruction is stopped until the electric stabilization point is attained so that the stepper motor performs powered rotation, and immediately stop applying the drive signal when the electric stabilization point is attained so that the stepper motor performs inertia rotation toward the mechanical stabilization point after the powered rotation. Preferably, the control system is configured to change an electric angle of the drive signal applied to the stepper motor by a step angle at every predetermined time period until application of the adjustment instruction is stopped. The step angle is smaller than an interval between two electric stabilization points. The control system is configured to continue applying the drive signal to change the electric angle of the drive signal by the step angle after the application of the adjustment instruction is stopped until the electric stabilization point is attained by the powered rotation. It is possible to determine that the electric stabilization point is attained when not only the electric stabilization point is actually attained but also an electric stabilization point, which is slightly different from but just before the electric stabilization point, is attained.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

Configuration

Figure 1:
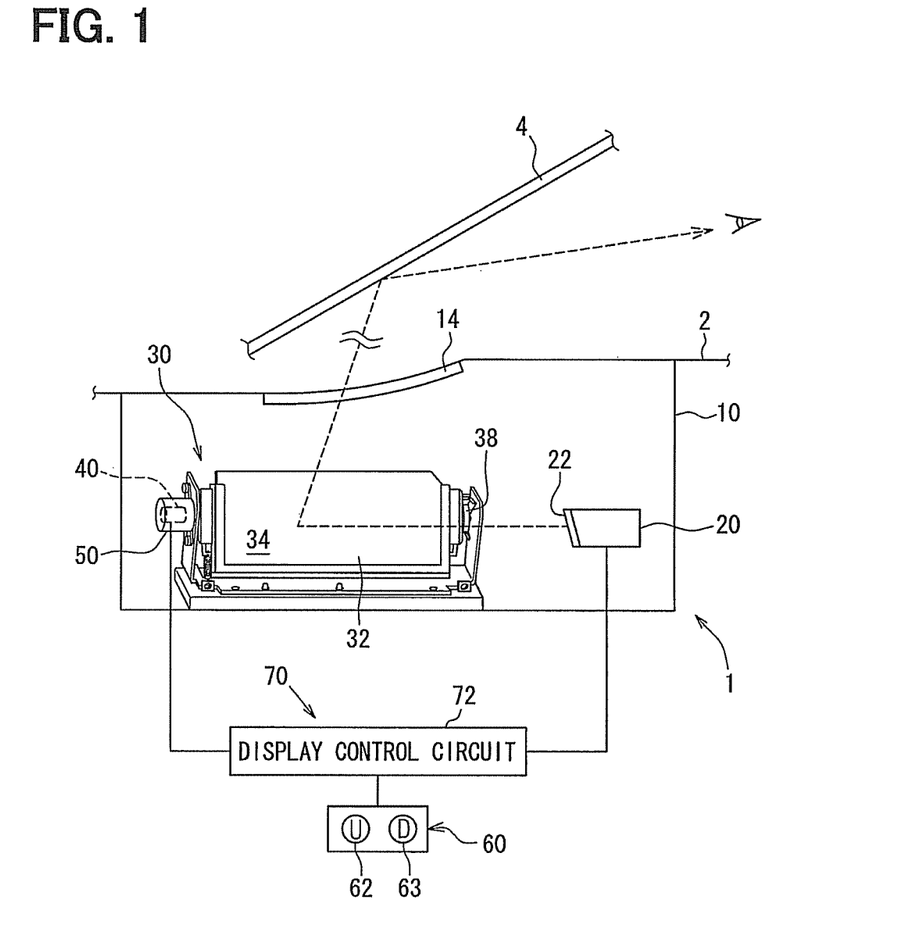
FIG. 1 is a schematic view of a head-up display (HUD) device for a vehicle according to one embodiment.

Referring first to FIG. 1, a head-up display (HUD) device 1 for a vehicle includes a housing 10, a display unit 20, an optical system 30, a stepper motor 40, a reduction gear mechanism 50, an adjustment switch 60 and a control system 70.

The housing 10 is formed in a hollow shape, which accommodates the other devices 20, 30, 40, 50 and the like of the HUD device 1, and mounted in an instrument panel 2 of a vehicle. The housing 10 has a translucent light projection window 14 at a position facing a windshield 4, which is fixed to a front side of a driver's seat of the vehicle as a projection target, in an up-down direction.

Figure 2:
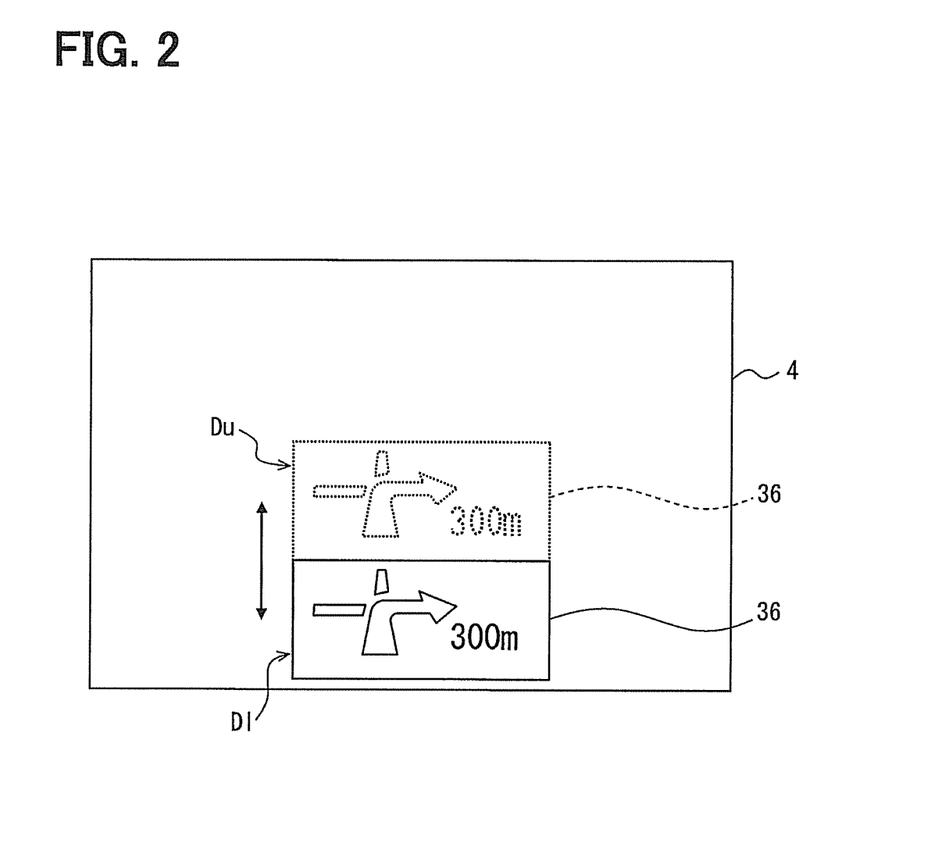
FIG. 2 is a schematic view of a virtual image displayed by the HUD device shown in FIG. 1.

The display unit 20 is a trans-illumination type liquid crystal panel (LCD) and has a screen 22 for displaying an image. The display unit 20 emits light of a display image of the screen 22 by illuminating the screen 22 by a built-in backlight (not shown). The light image displayed by the display unit 20 is for providing vehicle information related to vehicle driving or vehicle conditions. The light image provides, for example, navigation information such as a vehicle travel direction or the like (for example, FIG. 2). The display image of the display unit 20 may be a physical quantity data, which includes a vehicle speed, a residual fuel quantity, a coolant temperature or the like, and vehicle exterior condition information, which includes a traffic condition, a safety condition or the like, other than the navigation information.

The optical system 30 includes a number of optical parts including a reflection mirror 32 (other parts are not shown in FIG. 1), and projects the display image of the display unit 20 to the projection window 14. The reflection mirror 32 is formed of a concave mirror having a smooth reflection surface 34, which is curved in a concave shape. The reflection mirror 32 expands and reflects toward the projection window 14 side the display image, which is directly or indirectly incident as an optical image from the display unit 20 to the reflection surface 34. The reflection image of the reflection mirror 32 is projected to the windshield 4 through the projection window 14 and is image-formed at a forward side of the windshield 4. As a result, the vehicle information indicated by the display image of the display unit 20 is displayed at a driver's seat side in the vehicle as a virtual image 36 exemplarily shown in FIG. 2.

The reflection mirror 32 has a rotary shaft 38 supported rotatably in the housing 10. When the rotary shaft 38 is driven to rotate, the reflection mirror 32 moves a display position of the virtual image 36 in the up-down direction relative to the windshield 4 as exemplified in FIG. 2. The display of the virtual image 36 is realized between a lower limit display position Dl shown by solid lines in FIG. 2 and an upper limit display position Du shown by dotted lines in FIG. 2 in correspondence to optical characteristics of the optical system 30 and the windshield 4.

Figure 3:
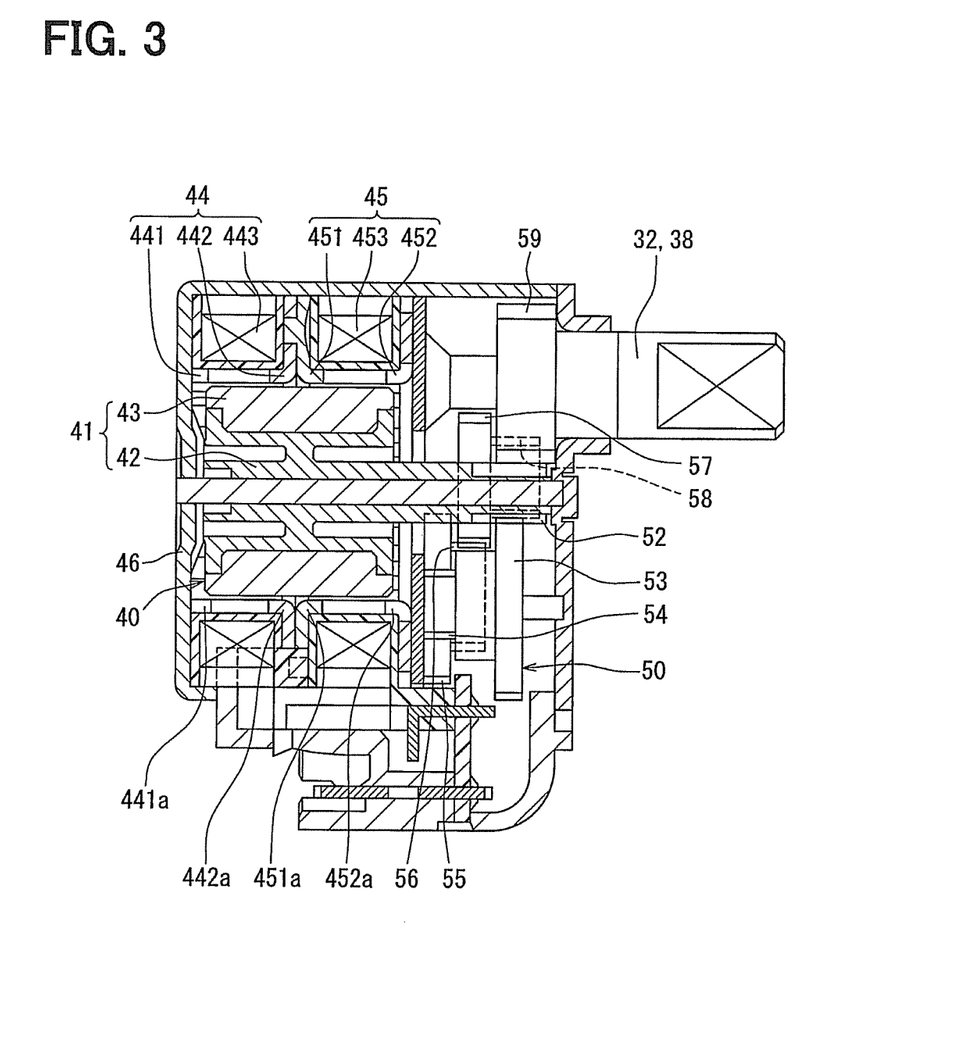
FIG. 3 is a sectional view of a stepper motor shown in FIG. 1 and a reduction gear.

As shown in FIG. 3, the stepper motor 40 is a claw-pole permanent magnet type and has a magnetic casing 46, a rotor 41 and stators 44, 45. The magnetic casing 46 is formed of magnetic material and in a hollow shape. The rotor 41 is formed of a motor shaft 42 and rotor magnets 43 attached to the outer peripheral surface of the motor shaft 42. The motor shaft 42 is supported rotatably by the magnetic casing 46. The rotor magnets 43 are permanent magnets and are arranged to provide magnetic poles N and S alternately in a circumferential direction (rotation direction) of the rotor 41.

Figure 4:
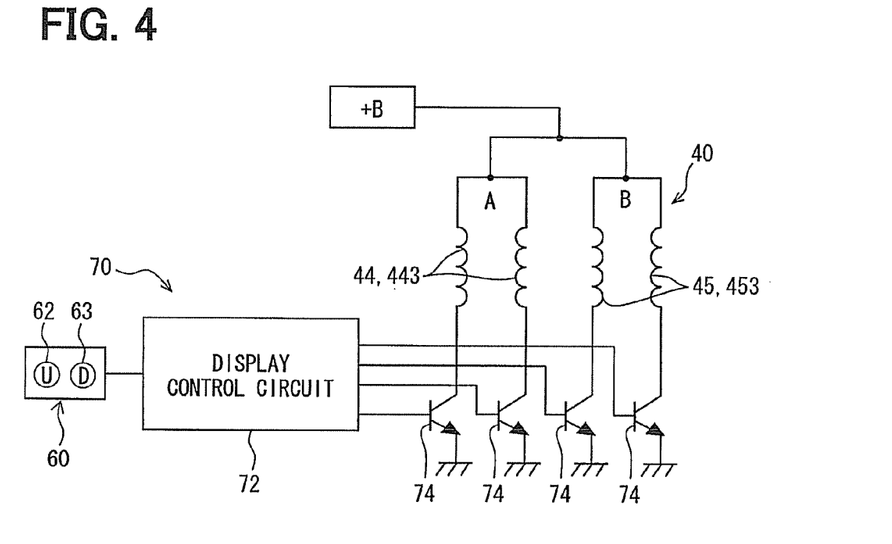
FIG. 4 is a block diagram of electric connection between the stepper motor shown in FIG. 1 and a control system therefor.
Figure 5:
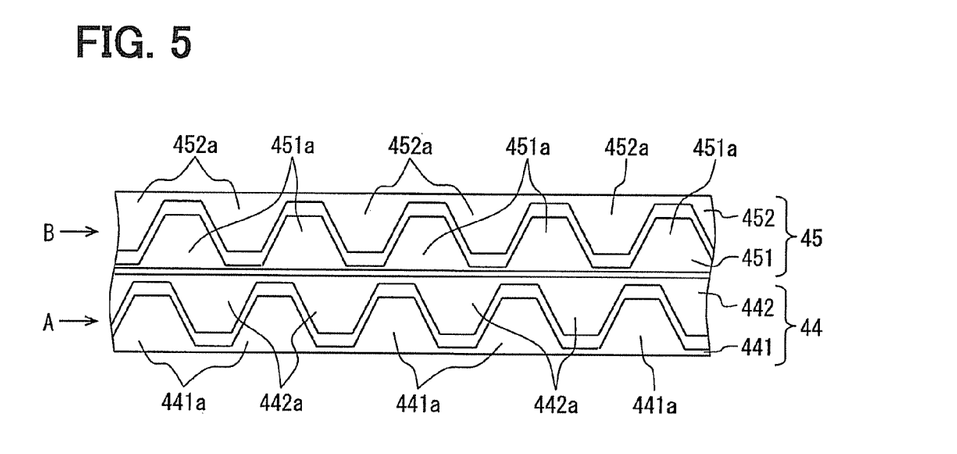
FIG. 5 is a schematic view of a stator shown in FIG. 3, which is expanded in plane in a rotation direction of a rotor.

The stators 44 and 45 are provided for two phases and firmly fixed to the magnetic casing 46 at a radially outside part relative to the rotor 41. As shown in FIG. 3 and FIG. 4, the stator 44 for one phase (A-phase) has magnetic yokes 441, 442 and a coil 443, and the stator 45 for the other phase (B-phase) has magnetic yokes 451, 452 and a coil 453. The magnetic yokes 441, 442, 451, 452 have a plurality of nail-shaped pole teeth (claw poles) 441a, 442a, 451a, 452a, respectively, as shown in FIG. 5 in the expanded manner. The pole teeth 441a, 442a of the magnetic yokes 441, 442 for the A-phase are interleaved to be alternately arranged in the circumferential or rotation direction of the rotor 41. Similarly, the pole teeth 451a, 452a of the magnetic yokes 451, 452 for the B-phase are interleaved to be alternately arranged in the circumferential or rotation direction of the rotor 41. The magnetic yokes 441, 442, 451, 452 are arranged such that the pole teeth 441a, 451a, 442a, 452a are shifted by ½ pitch each other in this order in the rotation direction of the rotor 41.

As shown in FIG. 3, the phase coil 443 is arranged coaxially with the magnetic yokes 441, 442 for the A-phase, and the phase coil 453 is arranged coaxially with the magnetic yokes 451, 452 for the B-phase. The coil 443 and the phase coil 453 are shifted from each in position in the axial direction. In the stepper motor 40 configured as described above, when the phase coil 443 of the A-phase and the phase coil 453 of the B-phase are energized by being powered by drive signals, respectively, the rotor magnets 43 and the motor shaft 42 are rotated.

The reduction gear mechanism 50 has plural gears 52 to 59 meshed in series in the magnetic casing 46. The gear 52 of the first stage is provided on the motor shaft 42 and the gear 59 of the last stage is provided on the rotary shaft 38 of the reflection mirror 32. Thus the rotary motion of the motor shaft 42 is reduced in accordance with gear ratios among the gears 52 to 59 and transferred to the rotary shaft 38 so that the reflection mirror 32 is driven to rotate. When the stepper motor 40 rotates in the normal rotation direction, the reflection mirror 32 is driven to rotate in the normal rotation direction so that the display position of the virtual image 36 is shifted upward, for example. When the stepper motor 40 rotates in the reverse rotation direction, the reflection mirror 32 is driven to rotate in the reverse rotation direction so that the display position of the virtual image 36 is shifted downward, for example.

The adjustment switch 60 shown in FIG. 1 and FIG. 4 is provided to be operable by the passenger on the driver's seat in the vehicle. The adjustment switch 60 has, for example, two push-type manipulation members 62 and 63 so that the passenger may selectively input an upward adjustment instruction for moving the display position of the virtual image 36 upward and a downward adjustment instruction for moving the display position of the virtual image 36 downward, respectively. The adjustment switch 60 is thus configured to output different instruction signals, one for instructing the upward adjustment and the other for instructing the downward adjustment.

The control system 70 includes a display control circuit 72 and plural switching elements 74 and is provided inside or outside the housing 10. The display control circuit 72 is an electronic circuit including a microcomputer as a main part and electrically connected to the display unit 20 and the adjustment switch 60. As shown in FIG. 4, each switching element 74 is a transistor, the collector of which is electrically connected to the phase coil 443 or 453. The emitter and the base of each switching element 74 are connected electrically to a grounding terminal (not shown) and the display control circuit 72. The switching element 74 varies amplitude of the drive signal applied to the phase coil 443 of the A-phase or the phase coil 453 of the B-phase in response to base signals inputted from the display control circuit 72. Thus, by controlling the base signal for the switching element 74 by the display control circuit 72, the drive signal applied to the phase coil 443 or 453 is controlled.

In the control system 70 configured as described above, the display control circuit 72 controls the image display of the display unit 20. The display control circuit 72 further controls the drive signals applied to the phase coils 443 and 453 in response to the instruction signals inputted from the adjustment switch 60. Specifically, the display control circuit 72 controls electric angles of the drive signals applied to the phase coils 443 and 453 to electric angles for driving the reflection mirror 32 in the normal rotation direction in response to the upward adjustment instruction generated by the operation member 62 so that the display position of the virtual image 36 is moved upward. Further, the display control circuit 72 controls an electric angles of the drive signals applied to the phase coils 443 and 453 to electric angles for driving the reflection mirror 32 in the reverse rotation direction in response to the downward adjustment instruction generated by the operation member 63 so that the display position of the virtual image 36 is moved downward.

Figure 6:
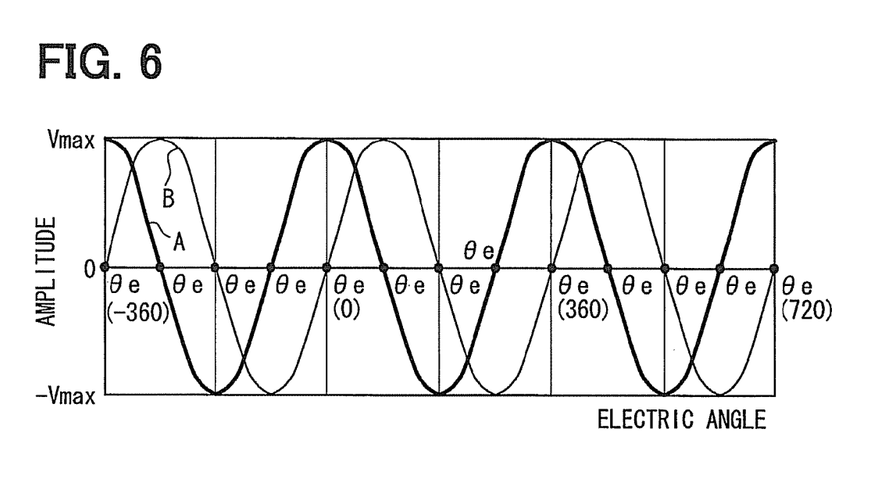
FIG. 6 is a characteristic diagram of a drive signal applied to the stepper motor shown in FIG. 1.

According to the HUD device 1 configured as described above, the voltage amplitudes of the drive signals, which are applied to the phase coils 443 and 453 of the A-phase and the B-phase to supply electric power to the stepper motor 40, are controlled to vary corresponding to the electric angles, respectively, for energizing the rotors 44 and 45 in two different phases. The drive signals for the phase coils 443 and 453 are controlled to be a maximum amplitude (Vmax, −Vmax) or a minimum amplitude (0) at every electric stabilization point θe, at which a holding torque for holding the motor shaft 42 is generated when the power is supplied. As exemplified in FIG. 6, the electric stabilization point ideally appears at every fixed angular interval of 90 degrees. However, the pole teeth 441a, 442a, 451a and 452a have tolerable differences in shape, position and the like thereamong. As a result, the actual interval between the electric stabilization points becomes longer or shorter than 90 degrees as exemplified in FIG. 7.

When no drive signal is applied to the phase coils 443 and 453, that is, in the non-energization period, plural mechanical stabilization points θm, at which a detent torque for holding the motor shaft 42 is generated, appear. The mechanical stabilization point θm is identical with the electric stabilization point θe ideally. However, as schematically exemplified in FIG. 7, it is likely in actual motor products that the mechanical stabilization point θm appears at a point, which is deviated from the electric stabilization point θe in phase in the rotation direction of the rotor 41. This deviation results from a difference in magnetic attraction forces, which are generated relative to the rotor magnets 43 when the motor is not energized by the pole teeth (pole teeth 451a and 452a in the example of FIG. 7) at the electric stabilization point θe in the energization phase and by the pole teeth (pole teeth 441a and 442a in the example of FIG. 7) adjacent to the pole teeth in the energization phase in the rotation direction.

Figure 8:
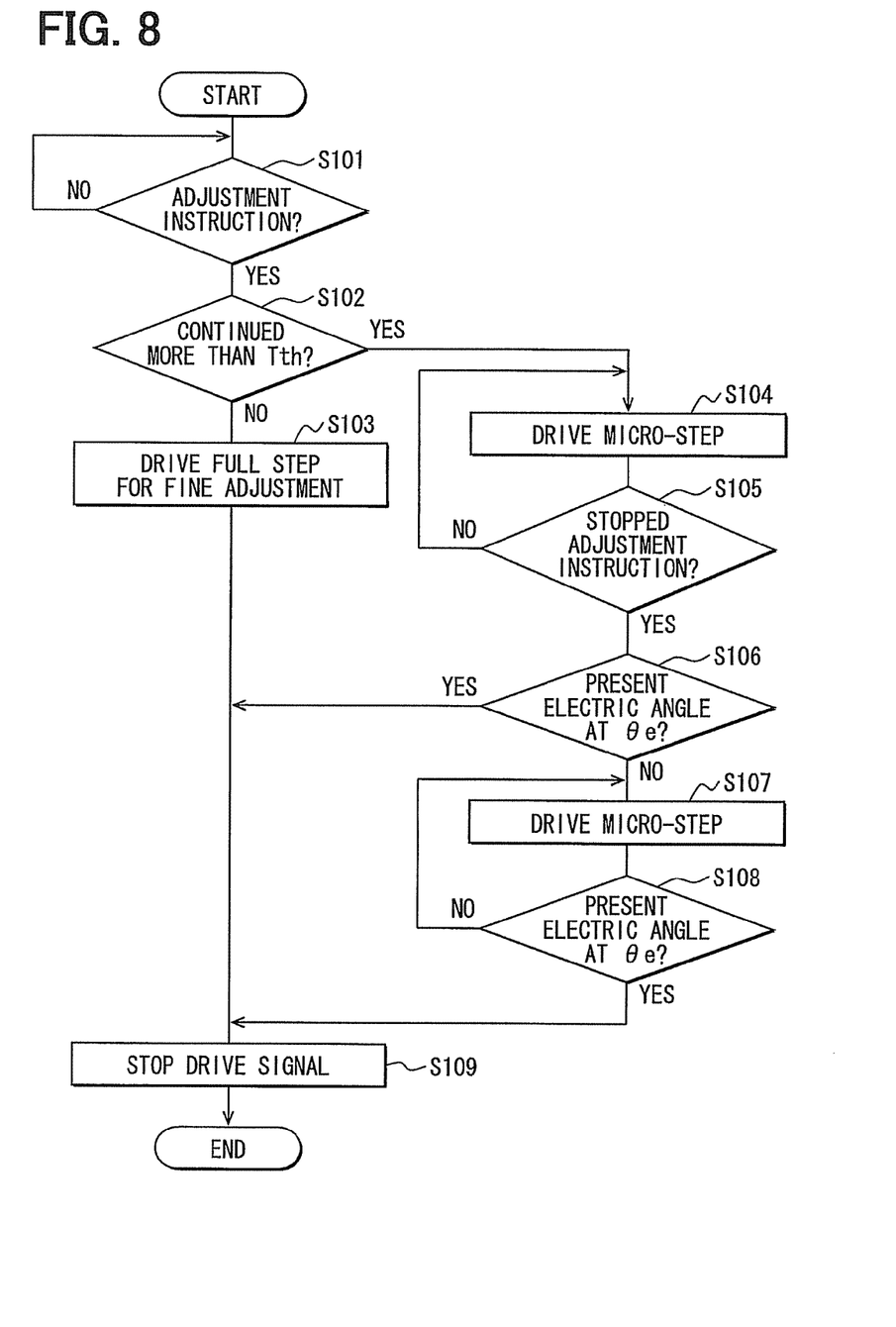
FIG. 8 is a flowchart of drive signal control processing executed by a display control circuit of the control system shown in FIG. 4.

For the stepper motor 40 having the stabilization points θe and θm, the display control circuit 72 controls the drive signals applied to the phase coils 443 and 453 in response to the instruction signal inputted from the adjustment switch 60 so that the display position of the virtual image 36 is adjusted. The display control circuit 72 is therefore configured to perform drive signal control processing based on a computer program as shown in a flowchart of FIG. 8. The drive signal control processing shown in FIG. 8 is started and finished, when an engine switch of the vehicle is turned on and off, respectively.

At S101 in the drive signal control processing, it is checked whether the instruction signal indicating the upward or downward adjustment instruction is inputted from the adjustment switch 60. If no instruction signal is inputted (S101: NO), S101 is repeated and no drive signal is applied to any of the phase coils 443 and 453. If the instruction signal of either instruction is, applied (S101: YES), S102 is executed.

At S102 following the upward adjustment instruction or the downward adjustment instruction, it is checked whether the manipulation member 62 or 63 corresponding to the inputted adjustment instruction is continuously operated for more than a threshold time period Tth based on the instruction signal inputted from the adjustment switch 60. The threshold time period Tth is set to, for example, about 0.5 seconds or other time periods, so that the passenger will not feel bored or uneasy because of a long period from the start of manipulation on the adjustment switch 60 to the actual change in the display position of the virtual image 36.

Figure 9A:
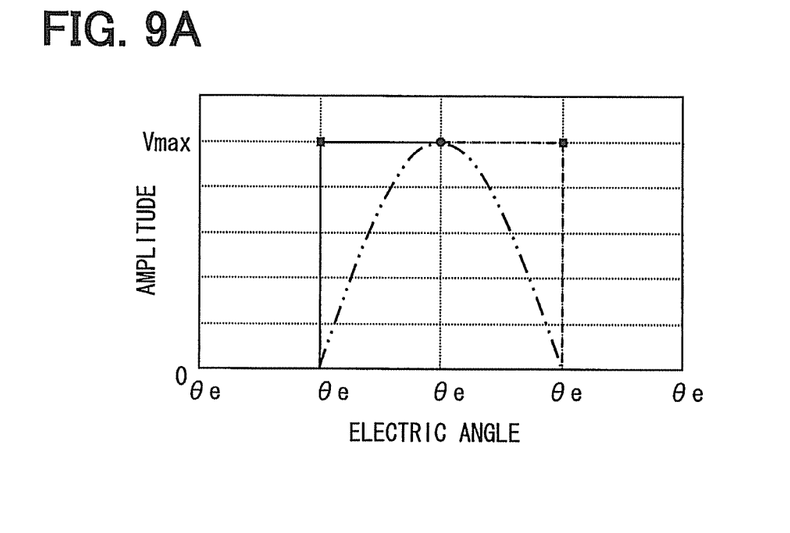
FIG. 9A and FIG. 9B are characteristic diagrams of drive signals applied to the stepper motor shown in FIG. 1.

If the instruction signal indicating the operation of the manipulation member 62 or 63 is temporary and not continued more than the threshold time period Tth (S102: NO), it is determined that the instruction of the upward adjustment or the downward adjustment indicates a fine adjustment of the display position of the virtual image 36. In this case, S103 is executed following S102. At S103, the drive signal applied to the phase coil 443, 453 is controlled as shown in FIG. 9A so that the stepper motor 40 is driven to make a full step rotation. That is, the drive signal is changed 90 degrees, which is a full step angle of one full step in the upward or the downward direction, from the present electric angle, that is, the electric stabilization point θe, to the next electric stabilization point θe. As a result, the reflection mirror 32 is driven to rotate in correspondence to a change in the electric angle of the stepper motor 40 so that the display position of the virtual image 36 is finely adjusted in accordance with a short-time manipulation of the manipulation member 62 or 63.

Figure 9B:
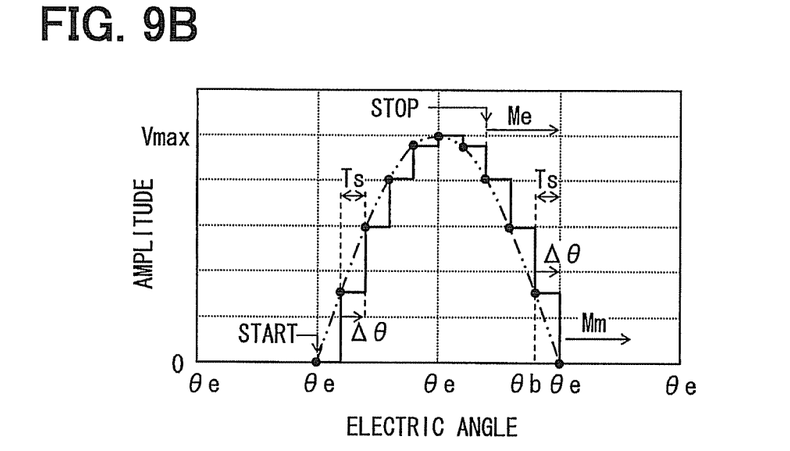

If the instruction signal indicating the operation of the manipulation member 62 or 63 is long and continued more than the threshold time period Tth (S102: YES), it is determined that the instruction of the upward adjustment or the downward adjustment indicates a continuous adjustment of the display position of the virtual image 36. In this case, S104 is executed following S102. At S104, the drive signal applied to the phase coil 443, 453 is controlled as shown in FIG. 9B, so that the stepper motor 40 is driven to make a micro-step rotation. That is, the drive signal is changed continuously for a predetermined period Ts in the upward or the downward direction, from the present electric angle to the next electric angle, which is different by a step angle Δθ for a micro-step driving. The step angle Δθ in the micro-step driving is predetermined to be, for example 18 degrees, which is far less than the interval of 90 degrees between the adjacent electric stability angles θe. The step angle Δθ may be determined as 90/N with N being an integer greater than two.

At S105 following S104, it is checked based on the instruction signal inputted from the adjustment switch 60 whether the input of the adjustment instruction by the manipulation member 62 or 63 stopped. If the manipulation member 62 or 63 is continuously operated (S105: NO), S104 is repeated. In each execution of S104, one micro-step driving of step angle Δθ is performed for the period Ts. Thus, the display position of the virtual image 36 is continuously adjusted. If the adjustment instruction by the manipulation member 62 or 63 is stopped (S105: YES), S106 is executed. At S106 it is further checked whether the present electric angle is at the electric stabilization point θe.

If the present electric angle does not equal the electric stabilization point Be yet (S106: NO), S107 is executed in the similar manner as at S104. That is, the micro-step driving is performed so that the electric angle is changed by one step angle Δθ per the period Ts. Subsequently, S108 is executed to check whether the present electric angle equals the electric stabilization point θe. If the present electric angle is not equal to the electric stabilization point θe yet (S108: NO), S107 is repeated to make the micro-step driving of the step angle Δθ per period Ts. Thus, as the micro-step driving is performed as indicated as an energized or powered rotation mode Me shown in FIG. 9B, the display position of the virtual image 36 is continuously adjusted. If the present electric angle equals the electric stabilization point θe (S108: YES), S109 is executed. At S109, the driving signals for the phase coils 443 and 453 are stopped.

Figure 7:
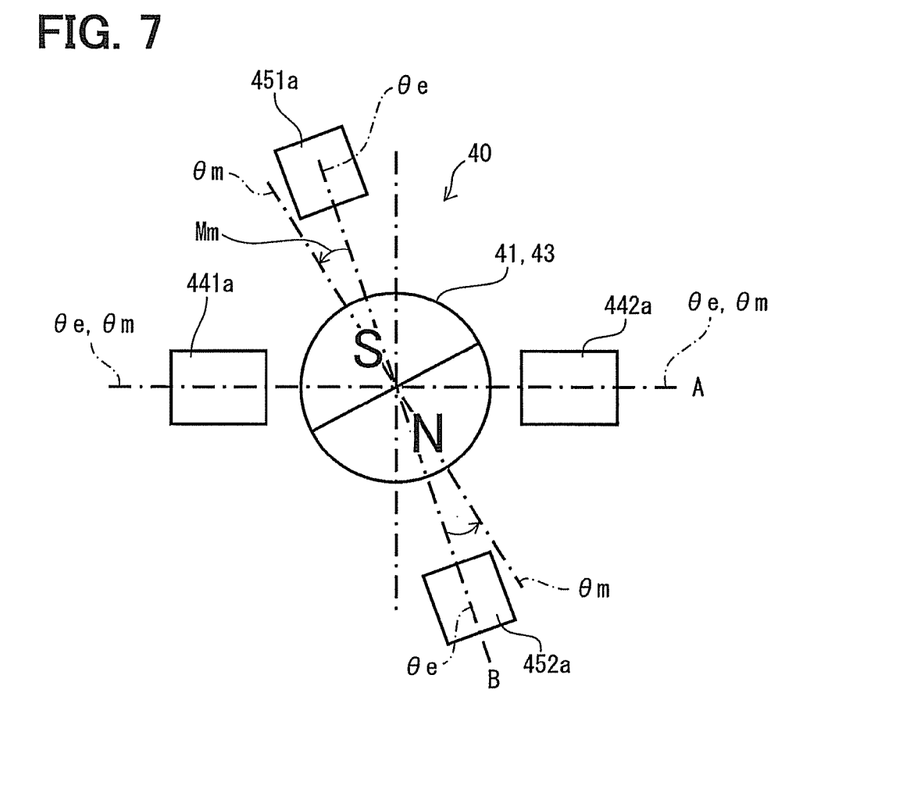
FIG. 7 is a schematic diagram of a characteristic and operation of the stepper motor shown in FIG. 1.

If the present electric angle is at a point, which is prior to the electric stabilization point θe by one step angle Δθ (that is, at angle position θb in FIG. 9B), when S106 is executed, the time interval from S107 of micro-step driving to S109 through S108 substantially equals the predetermined period Ts. That is, after the electric angle reaches a point, which is prior to the electric stabilization point Be by one step angle Δθ, the drive signal is continued to be applied for one more period Is and then stopped at the electric stabilization point θe. By thus stopping the application of the drive signal, the rotor 41 of the stepper motor 40 rotates by inertia in the inertia rotation mode Mm toward the mechanical stabilization point θm, which is nearest to the electric stabilization point θe of the application stop time as shown in FIG. 7. The rotor 41 thus stops at or near the mechanical stabilization point θm.

If the present electric angle reaches the target stabilization point Bet after S103 or at S106 as shown in FIG. 8, S109 is executed. After S109, the drive signal control processing is repeated from S101 until the engine switch is turned off.

Operation

In the HUD device 1, when inputting the adjustment instruction by the continuous operation (for example, pushing) on the manipulation member 62 or 63 is stopped, the energized rotation mode Me is generated. In this mode Me, the drive signal is continued to be applied to the stepper motor 40 by the control system 70 until the electric stabilization point θe is attained by the holding torque. When the electric angle θe is attained, the inertia rotation mode Mm appears following the energization rotation mode Me, in which the control system 70 stops the application of the drive signal. The stepper motor 40 rotates by inertia toward the mechanical stabilization point θm by the detent torque. By thus changing the rotation mode from the energization rotation mode Me to the inertia rotation mode Mm in sequence, the stepper motor 40 rotated by the continued application of the drive signal to the electric stabilization point θe can be rotated continuously toward the mechanical stabilization point θm without being stopped at the electric stabilization point θe. The display position of the virtual image 36, which is adjusted by the stepper motor 40 rotating continuously in accordance with the rotation of the reflection mirror 32, is continuously adjusted crossing the point corresponding to the electric stabilization point θe. For this reason, the reliability of the virtual image 36 of the vehicle information is improved.

In the HUD device 1, in particular, when the electric angle reaches the angle, which is before the electric stability angle θe by one step angle Δθ, in the energized rotation mode Me at the time of stopping the input of the adjustment instruction, the application of the drive signal to the stepper motor 40 by the control system 70 is stopped after being continued for the predetermined period Ts. The predetermined period Ts is set to be a period, which changes the electric angle of the drive signal by the step angle Δθ smaller than the interval of the electric stabilization points Be while the adjustment instruction is being inputted. This period substantially equals the time period, in which the stepper motor 40 rotates by the application of the drive signal from the electric angle, which is one step angle Δθ prior to the electric stabilization point θe to the electric stabilization point Be. The application of the drive signal in the energized rotation mode Me is surely stopped at the time of arrival at the electric stabilization point θe after an elapse of the predetermined period Ts. As a result, in the subsequent inertia rotation mode Mm, the stepper motor 40 can be rotated by inertia toward the mechanical stabilization point θm without being stopped at the electric stabilization point θe. It is thus surely prevented that the display position of the virtual image 36 moves again after stopping at the position corresponding to the electric stabilization point Be. The virtual image 36 of the vehicle information can be displayed with high reliability.

Other Embodiment

The HUD device 1 described above is not limited to the above-described embodiment but may be implemented in many other embodiments.

For example, S102 and S103 may be omitted and the drive signal control processing may be performed without full step driving. The full step driving may be performed at S104 and S107. The stepper motor 40 may be other than the permanent magnet type, for example a motor of a variable reluctance type, a hybrid type or the like, as far as the motor has a difference in phase between the electric stabilization point θe determined by the holding torque and the mechanical stabilization point θm determined by the detent torque. The display unit 20 may be other than the liquid crystal panel. For example, it may be an EL (electroluminescence) panel or a unit, which provides a light emission image by indicators or the like. The projection target, to which the reflection image of the reflection mirror is projected, is not limited to the windshield. It may be a combiner or the like, which is provided exclusively in the HUD device.

In addition, it is possible to execute S106, S108 to check whether the present electric angle is just before the electric stabilization point θe. That is, S106 is executed to check whether the electric stabilization point θe is attained including a case that the present electric angle is just before attaining the electric stabilization point θe.

What is claimed is:

1. A head-up display device for a vehicle comprising:
a display unit for displaying a light-emitted image;
an optical system including a reflection mirror, which is provided rotatably to reflect the light-emitted image and project a reflected image toward a projection target so that a virtual image of vehicle related information is displayed;
a stepper motor for driving, when powered by a drive signal, the reflection mirror to rotate for adjusting a display position of the virtual image, the stepper motor having plural electric stabilization points, at which a motor operation is electrically stabilized by a holding torque generated when powered, and plural mechanical stabilization points, at which the motor operation is stabilized by a detent torque generated when not powered;

a control system for controlling the drive signal for the stepper motor in response to an adjustment instruction inputted from an external side, wherein the stepper motor is configured to have a powered rotation mode and an inertia rotation mode, wherein, in the powered rotation mode, the control system is configured to continue to apply the drive signal even after the adjustment instruction is stopped until the electric stabilization point is attained, so that the stepper motor performs powered rotation, and immediately stop applying the drive signal when the electric stabilization point is attained, wherein, in the inertia rotation mode, the stepper motor performs inertia rotation toward the mechanical stabilization point after the powered rotation mode; and wherein the stepper motor has phase coils, to which electric power is supplied by the drive signal to electrically stabilize the stepper motor by the holding torque at the electric stabilization points in the powered rotation mode and no electric power is supplied to mechanically stabilize the stepper motor by the detent torque at the mechanical stabilization points during the inertia rotation.

2. The head-up display device for a vehicle according to claim 1, wherein:

the control system is configured to change an electric angle of the drive signal applied to the stepper motor by a step angle at every predetermined time period while application of the adjustment instruction is continued, the step angle being smaller than an interval between two electric stabilization points; and the control system is configured to stop application of the stepper motor after continuing the application of the drive signal for the predetermined time period when an electric angle, which is one step angle before the electric stabilization point, in the powered rotation mode, which is after the application of the adjustment instruction is stopped.

3. The head-up display device for a vehicle according to claim 2, wherein:

the step angle is predetermined to be 90/N with N being greater than 2.

4. The head-up display device for a vehicle according to claim 1, wherein:

the control system is configured to check whether a present electric angle of the stepper motor is at the electric stabilization point after the adjustment instruction is stopped.

5. The head-up display device for a vehicle according to claim 1, wherein the electrical stabilization point and the mechanical stabilization point are different in phase.

6. The head-up display device for a vehicle according to claim 1, wherein the control system does not apply the drive signal in the inertia rotation mode.

* * * * *